United States Patent
Miyamoto

(10) Patent No.: US 7,298,916 B2
(45) Date of Patent: Nov. 20, 2007

(54) IMAGE SIGNAL PROCESSING APPARATUS AND METHOD

(75) Inventor: Tsuneo Miyamoto, Yamato (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 1071 days.

(21) Appl. No.: 10/334,794

(22) Filed: Jan. 2, 2003

(65) Prior Publication Data
US 2003/0132902 A1 Jul. 17, 2003

(30) Foreign Application Priority Data
Jan. 11, 2002 (JP) .............................. 2002-005299

(51) Int. Cl.
- G06K 9/40 (2006.01)
- G06K 9/36 (2006.01)
- G09G 5/00 (2006.01)
- G09G 3/18 (2006.01)
- H04N 7/00 (2006.01)
- H03L 7/00 (2006.01)

(52) U.S. Cl. .................. 382/254; 382/276; 348/497; 348/505; 348/521; 348/536; 345/204; 345/3.1; 345/53; 345/94

(58) Field of Classification Search ................ 382/254, 382/260–264, 270–275, 276, 278, 325; 345/204, 345/3.1–3.4, 53, 94, 98–99; 348/497–499, 348/505, 506, 521, 524, 536–537, 540–541
See application file for complete search history.

(56) References Cited

U.S. PATENT DOCUMENTS

| | | | | |
|---|---|---|---|---|
| 4,325,075 A * | 4/1982 | Kashigi et al. | ............. | 348/514 |
| 4,525,747 A * | 6/1985 | Sakai et al. | ................. | 358/466 |
| 4,635,097 A * | 1/1987 | Tatami | ...................... | 348/505 |
| 4,698,601 A * | 10/1987 | Aizawa | ....................... | 348/537 |
| 4,748,510 A * | 5/1988 | Umezawa | ..................... | 345/87 |
| 4,795,239 A * | 1/1989 | Yamashita et al. | ............ | 345/96 |
| 5,359,366 A * | 10/1994 | Ubukata et al. | ............ | 348/536 |
| 5,426,468 A * | 6/1995 | Jenison | ....................... | 348/514 |
| 5,805,233 A | 9/1998 | West | | |
| 6,462,726 B1 * | 10/2002 | Hamada et al. | ............... | 345/98 |
| 6,593,871 B1 * | 7/2003 | Miethig et al. | ............. | 341/157 |
| 6,636,205 B1 * | 10/2003 | Lasneski | ..................... | 345/204 |
| 6,678,408 B1 * | 1/2004 | Ruggiero et al. | ........... | 382/168 |
| 6,700,570 B2 * | 3/2004 | Tachibana et al. | ............ | 345/99 |
| 6,850,583 B1 * | 2/2005 | Matsumura et al. | ........ | 375/376 |
| 6,989,823 B1 * | 1/2006 | Lasneski | ..................... | 345/204 |

* cited by examiner

FOREIGN PATENT DOCUMENTS

JP   11-311967 A   11/1999

Primary Examiner—Bhavesh M Mehta
Assistant Examiner—Manav Seth
(74) Attorney, Agent, or Firm—Sughrue Mion Pllc.

(57) ABSTRACT

When performing A/D conversion on image signals, when reducing noise that is caused by jitter by adjusting the phase of the sampling clocks, even if the input waveform has considerable waveform distortion such as a triangular wave, it is possible to reliably reduce this noise. Input analog image signals are converted into digital image data using sampling clocks from a PLL circuit by A/D conversion means. Next, image data that has delayed by a 1 clock delay circuit is subtracted from the digital data by a subtracter. The maximum value of one screen of the subtracted output is then determined, and 5 is subtracted therefrom to provide a threshold value. A comparator compares the subtracted output and the threshold value, and outputs a signal when the subtracted output is greater than the threshold value. A counter then supplies the count value of these signals to a CPU, and the CPU controls the phases of the sampling clocks using a switch. The CPU is thus able to control the frequency characteristics of the input image signals by switching a switch of a frequency correction circuit in accordance with the count value.

21 Claims, 5 Drawing Sheets

Fig. 4 WHEN WAVEFORM IS CORRUPTED WAVEFORM (TRIANGULAR WAVE) OF SIGNAL WAVEFORM OF 1 dot

IMAGE SIGNAL PROCESSING APPARATUS AND METHOD

BACKGROUND OF THE INVENTION

1. Field of the Invention

The present invention relates to an image signal processing apparatus and method that are favorably used when displaying on a display apparatus image signals obtained by performing A/D conversion processing on analog image signals.

2. Description of the Related Art

Conventionally, when analog image signals are displayed on digital display element such as a liquid crystal display (LCD) panel, it is necessary for the analog image signals to be converted into digital image data by an A/D converter. In this case, the sampling clocks supplied to the A/D converter may be generated by a PLL circuit that is synchronized with a horizontal synchronization signal of the original image signal, however, if there is variation in the sampling clocks because of jitter in the PLL circuit, or jitter in the horizontal synchronization signal or the image signal, then noise appears on the screen.

In order to solve this problem, conventionally, a method is used in which adjustment is performed such that phases of the sampling clocks are shifted and the phase with the least noise is used.

FIG. 5 is a block diagram showing the structure of a conventional image signal processing apparatus that employs the above method.

In FIG. 5, analog image signals (video signals) are input into an A/D converter 1. These image signals may have, for example, a resolution of 1280×1024, a horizontal frequency of 80 KHz, a vertical frequency of 75 Hz, and a sampling rate of 135 MHz. 135 MHz sampling clocks SCK are supplied from a PLL circuit 2 to the A/D converter 1. Digital image data converted by the A/D converter 1 is processed by a signal processing section 8, and then supplied to an LCD panel 9 where it is displayed.

The PLL circuit 2 is formed by a voltage controlled oscillator (VCO) 3 that outputs sampling clocks SCK, a frequency divider 4 that divides the sampling clocks SCK into $1/1688$, a delay circuit group 5 that delays the phases of the divided outputs into 32 stages, a switch 6 that selects one of the 32 delayed outputs using the control of the CPU 10, and a phase comparator 7 that performs a phase comparison of the selected divided outputs and a horizontal synchronization signal, and controls the oscillation frequency of the VCO 3 in accordance with the phase difference.

According to the PLL circuit 2 having the above described structure, as a result of the CPU 10 selecting one of the 32 delayed outputs from the delay circuit group 5, it is possible to use the delayed output with the least noise as the sampling clock SCK.

However, even when the above method of adjusting the phases of the sampling clocks is used, if there is a large distortion in the original image waveform, the problem arises that it is not possible to remove the noise sufficiently. In particular, high frequency components may be deleted in image signals output from a PC, and the waveform of one dot (i.e., the waveform of one pixel) may not be a rectangular wave and in some cases may be a triangular wave. If this type of triangular wave is sampled by a sampling clock having a jitter component, a large luminance difference is generated in the sampling data, and the problem arises that noise can be easily generated on the screen.

SUMMARY OF THE INVENTION

The present invention was conceived in order to solve the above problems, and it is an object thereof to enable noise caused by jitter in the sampling clocks of the A/D converter to be reduced in an A/D conversion method in which the phases of the sampling clocks are adjusted, even when there is a large distortion such as a triangular wave in the image waveform.

In order to achieve the above object, the image signal processing apparatus of the present invention comprises: frequency correction means that corrects frequency characteristics of analog signals; A/D conversion means that converts analog image signals that have undergone frequency correction in the frequency correction means into digital image data; clock generation means that supplies sampling clocks to the A/D conversion means, and also that is structured such that phases of the sampling clocks can be adjusted; level difference calculation means that determines a value of a difference between two adjacent dot waveform levels in the A/D converted image data; maximum value detection means that determines a maximum value of the level difference value in one screen for each phase of the sampling clocks; comparison means that compares a threshold value obtained by subtracting a predetermined value from a maximum value of the determined level difference value with a level difference value determined by the level difference calculation means, and outputs a comparison result signal when the level difference value is higher than the threshold value; counting means that counts the comparison result signals; and control means that controls the clock generation means, and controls phases of the sampling clocks, and also controls frequency characteristics of the frequency correction means in accordance with a count value of the counting means.

Moreover, the image signal processing method of the present invention is a method in which phases of sampling clocks are controlled when analog image signals undergo A/D conversion using sampling clocks and are converted into digital image data, wherein a value of a difference in level between two adjacent dot waveforms in the A/D converted image data is determined, a maximum value of the level difference value in one screen is determined for each phase of the sampling clocks, a threshold value obtained by subtracting a predetermined value from this maximum value is compared with the level difference value, and frequency characteristics of the analog image signals are controlled in accordance with the number of times the level difference value is higher than the threshold value.

According to the above structure, input analog image signals are converted into digital image data by the A/D conversion means. At this time, the phases of sampling clocks supplied from the clock generation means are controlled in, for example, 32 stages by the control means. The level difference calculation means determines a value of a difference between two adjacent dot waveform levels in the A/D converted image data, and the maximum value detection means determines the maximum value of the level difference value within one screen for each phase of the sampling clocks. The comparison means compares the threshold value obtained by subtracting a predetermined value from the maximum value with the level difference value determined by the level difference calculation means, and outputs a comparison result signal when the level difference value is higher than the threshold value. The counting means counts the comparison result signals, and, in accordance with this count value, the control means controls frequency characteristics of the input analog image signals by controlling the frequency correction means. As a result, the waveform of the input analog image signals is corrected to a shape close to a trapezoid shape, and it is possible to increase the sampling tolerance even when the sampling clocks are afflicted with jitter.

Accordingly, when performing A/D conversion on image signals, when noise that is caused by jitter in the sampling clocks is reduced by adjusting the phase of the sampling clocks, even if the input waveform has considerable waveform distortion such as a triangular wave or trapezoid wave with overshoot, it is possible to correct this appropriately and increase the sampling tolerance and well as reliably reduce noise caused by jitter.

DESCRIPTION OF THE PREFERRED EMBODIMENT

The embodiment of the present invention will now be described together with the drawings.

Firstly, the theory behind the present embodiment will be described.

As described above, when A/D conversion is performed on triangular wave single dot waveforms from which the high frequency component has been deleted using sampling clocks having jitter, the more luminance differences are generated in the sampling data, the greater the increase in the screen noise. Therefore, if the high frequency components in the triangular waveform are compensated so as to change the waveform into one close to a trapezoid wave (or rectangular wave), then by adjusting phases of the sampling clocks such that the sampling point is in the center of the flat portion of this trapezoid wave, it becomes difficult for luminance differences to be generated in the sampling data even if the samplings vary because of jitter.

Accordingly, it is necessary to be able to appropriately adjust the extent of the compensation of the high frequency component in the original image waveform, and the present embodiment provides a method for performing this phase adjustment.

To achieve this, firstly, the value of the difference in the levels of the waveforms of two adjacent dots (i.e., the luminance difference value) is taken. Then by taking the maximum value of the level difference value within one screen for each phase of the sampling clocks (each phase when the area between two sampling points is divided, for example, into 32 parts), the envelope thereof has an analogous shape with the original dot waveform. Next, a value obtained by subtracting a particular value from the above maximum value is set as a threshold value. The number of sampling clocks (the number of clock phases that have been divided into 1/32) in a portion higher than this threshold value is then counted, and the compensation amount for the frequency characteristics is adjusted in accordance with this count value. For example, when the count value is low, adjustment is performed such that the high frequency component of the original waveform is raised.

A specific description will now be given of FIG. 4.

Figure 4:
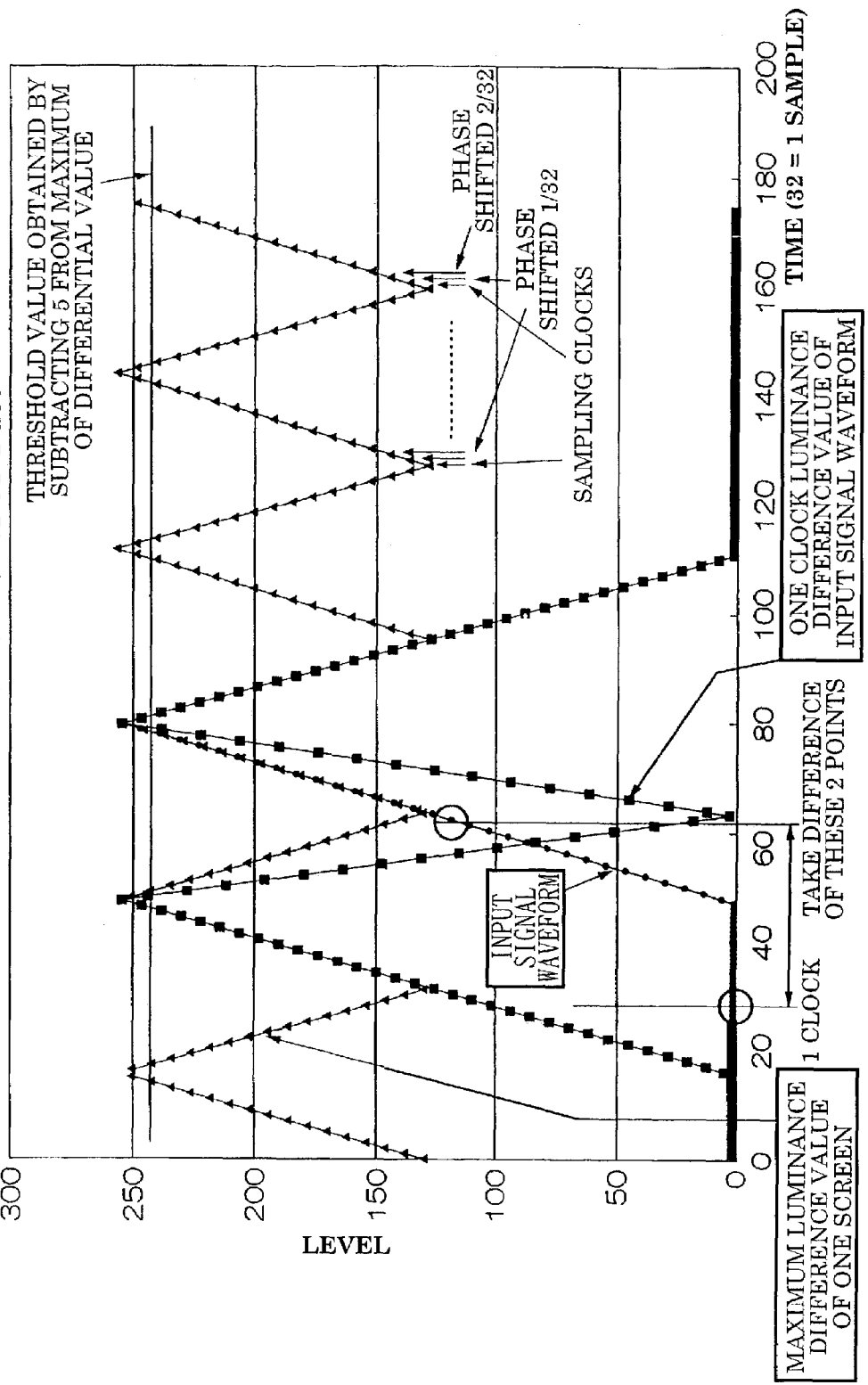
FIG. 4 is a characteristic view showing a sampling state when an input waveform is a triangular wave.

FIG. 4 shows a case in which only one dot within the screen is white and all the other dots are black, with the white dot being a triangular wave. The input signal waveform of the 1 dot shown by the symbol a in the drawing is a triangular wave. As is shown in FIG. 4, this triangular waveform has 255 white levels, while all the other portions of the screen have zero black levels.

Here, it will be assumed that the screen is sampled using the sampling clock of one phase from among the 32 phases. At this time, two adjacent white and black dots are respectively sampled at the point shown by the symbol, and the luminance difference (level difference value) between the two is determined. The other portions within the screen are also sampled by the sampling clock of this phase, and each time the luminance difference of adjacent dots is determined. This operation is performed for each of the 32 sampling clocks on the same screen, and the respective luminance differences are obtained in the same way. As a result, the luminance differences determined for each phase of the sampling clocks are shown by b in FIG. 4. In addition, the maximum value is determined from among each of the luminance differences. The envelope of the maximum values that are determined in this manner is shown by c in FIG. 4, and this shape is analogous with the input waveform a. c has an apex for the rise portion and the fall portion of the input waveform a, with a maximum value of 255 and a minimum value of 128.

Next, a value lower than the maximum value by, for example, 5 is set in c as a threshold value. Next, the number of sampling clocks present above this threshold value in c is determined as three.

Figure 2:
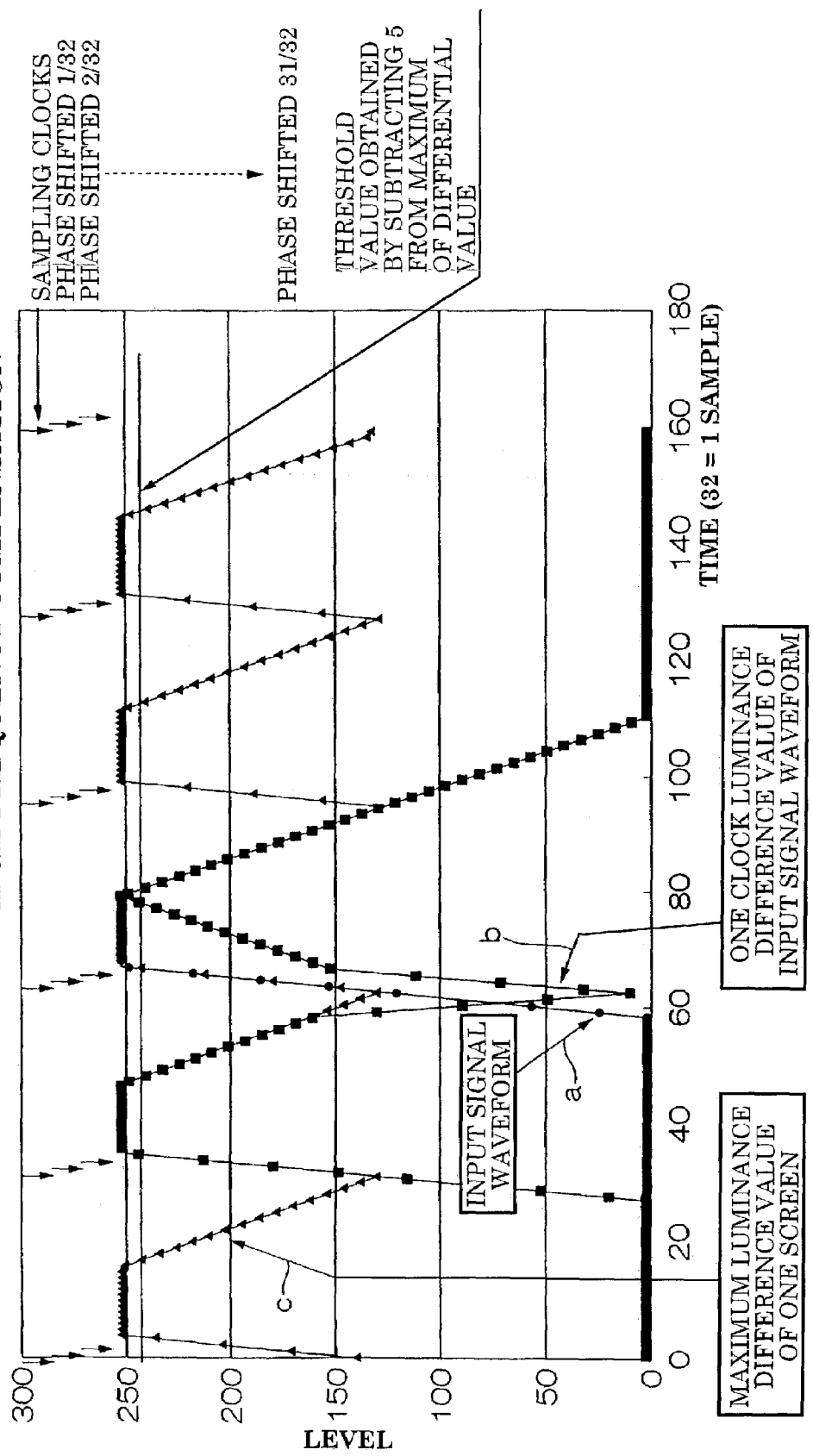
FIG. 2 is a characteristic view showing a sampling state when an input waveform is high frequency compensated to form a trapezoid wave.

Next, the high frequency component in the triangular wave, which is the input waveform, is compensated so that the input waveform a is given a trapezoid wave, as shown in FIG. 2. Next, using the same screen as for the above triangular wave for this trapezoid wave, in the same manner, the luminance difference is determined for 32 sampling clocks (FIG. 2b), and then when the maximum value from each luminance difference is determined, a shape analogous with the input waveform a is obtained such as c shown in FIG. 2. Therefore, by setting a value, for example, lower than the maximum value of the analogous shape c by 5 as a threshold value, the number of sampling clocks present equal to or more than this threshold value is ten or more.

Because the number of sampling clocks equal to or more than the threshold value is three in the case of FIG. 4, and in the case of FIG. 2 is ten or more, the sampling tolerance is higher in FIG. 2. Namely, in the case of FIG. 4, in order to sample a value close to 255 that is the true value of this dot, it is only possible to sample one of these three clocks. However, in the case of FIG. 2, it is possible to sample a value close to 255 using any of ten or more clocks.

Figure 3:
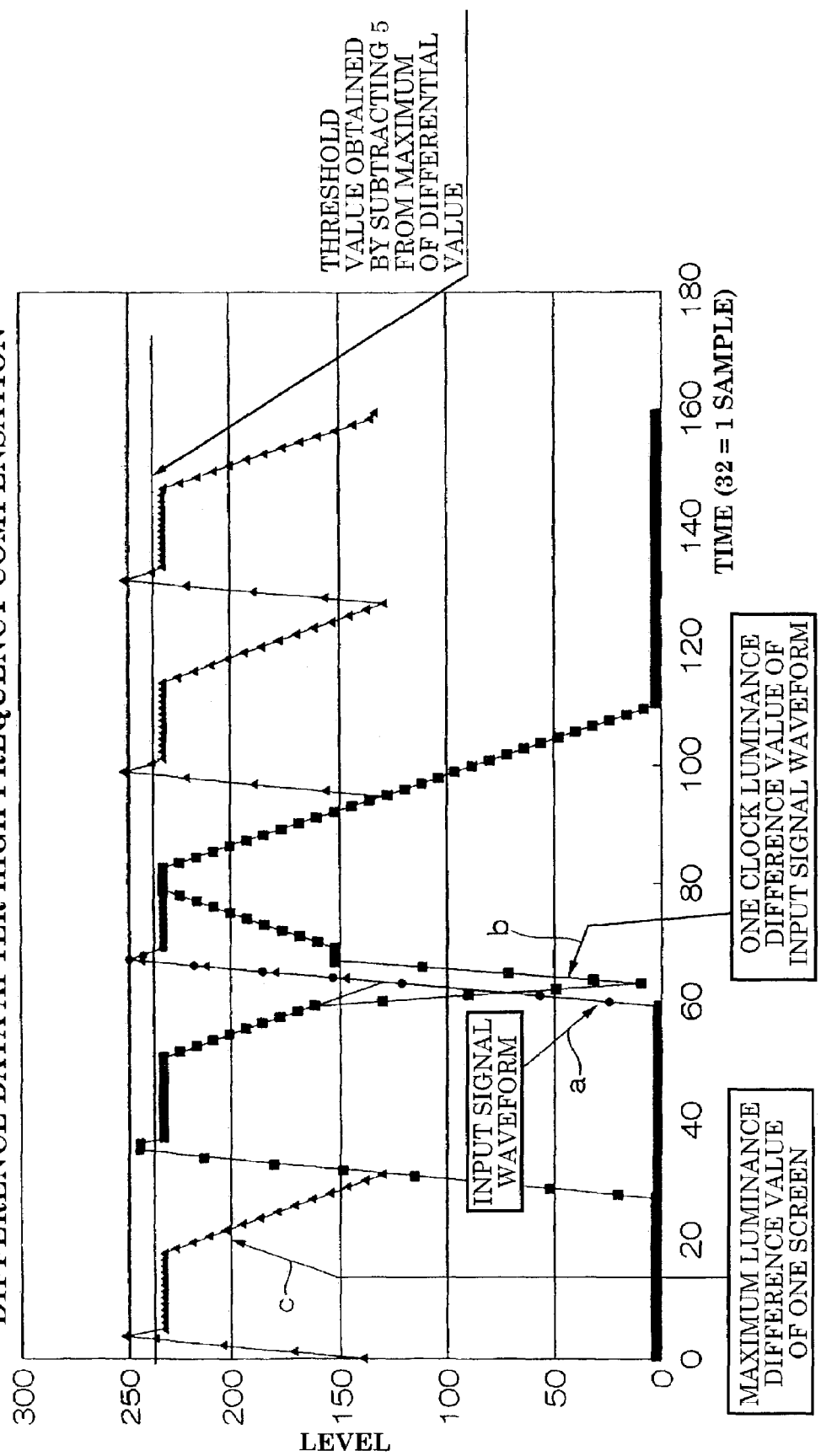
FIG. 3 is a characteristic view showing a sampling state when an overshoot is generated in a trapezoid wave.

FIG. 3 shows a case in which the high frequency component in the triangular wave is over compensated, or when the level of the high frequency component of the input signal is high. As is shown in the drawing, the high frequencies are raised too much and an overshoot is generated in the trapezoid wave. Therefore, it is shown that the number of sampling clocks in excess of the threshold value obtained by subtracting 5 from the maximum value is just three. In this case, as is described below, by compensating the low frequencies so as to reduce the overshoot, it is possible to increase the sampling tolerance.

Figure 1:
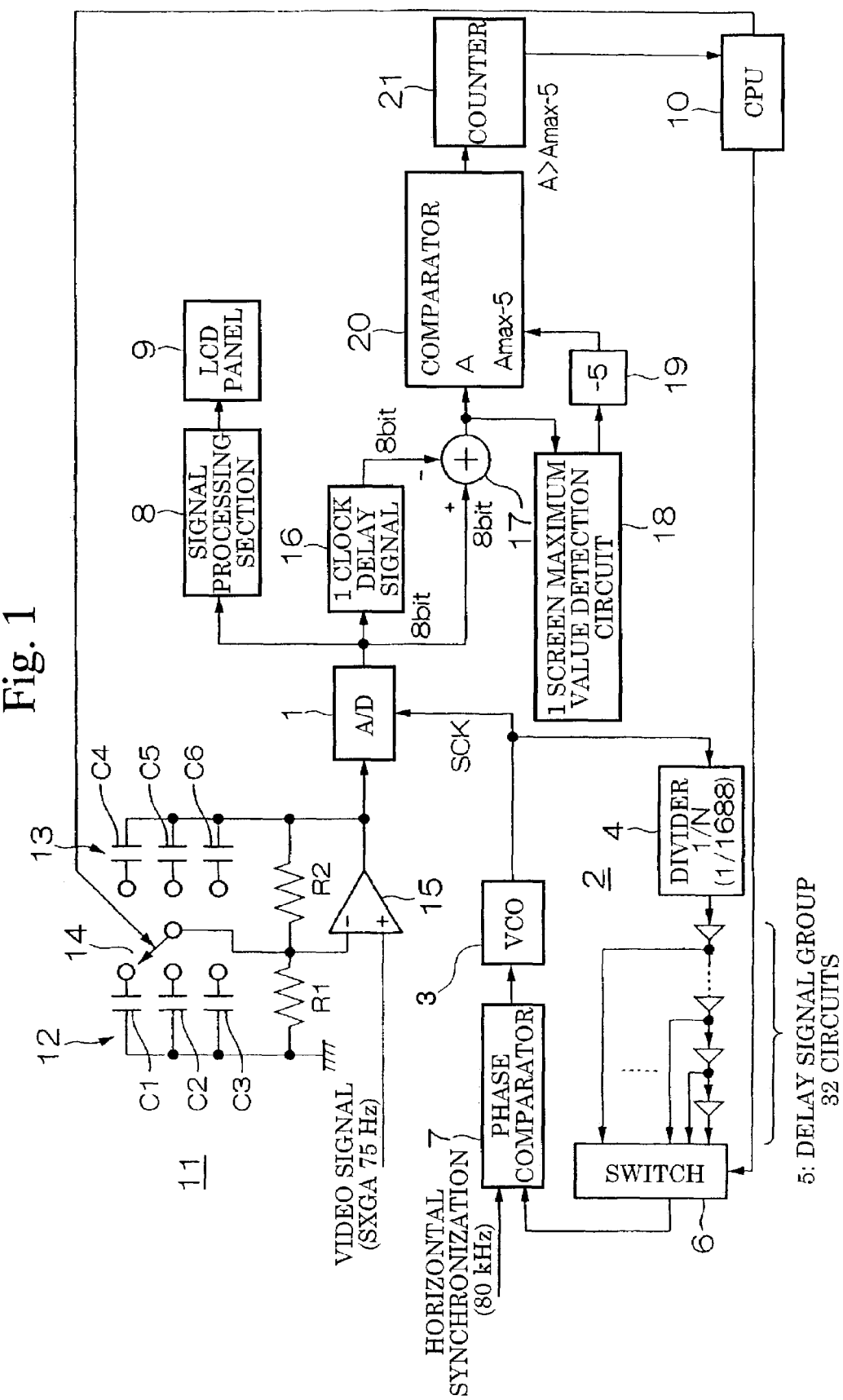
FIG. 1 is a circuit structure diagram showing the image signal processing apparatus according to an embodiment of the present invention.
Figure 5:
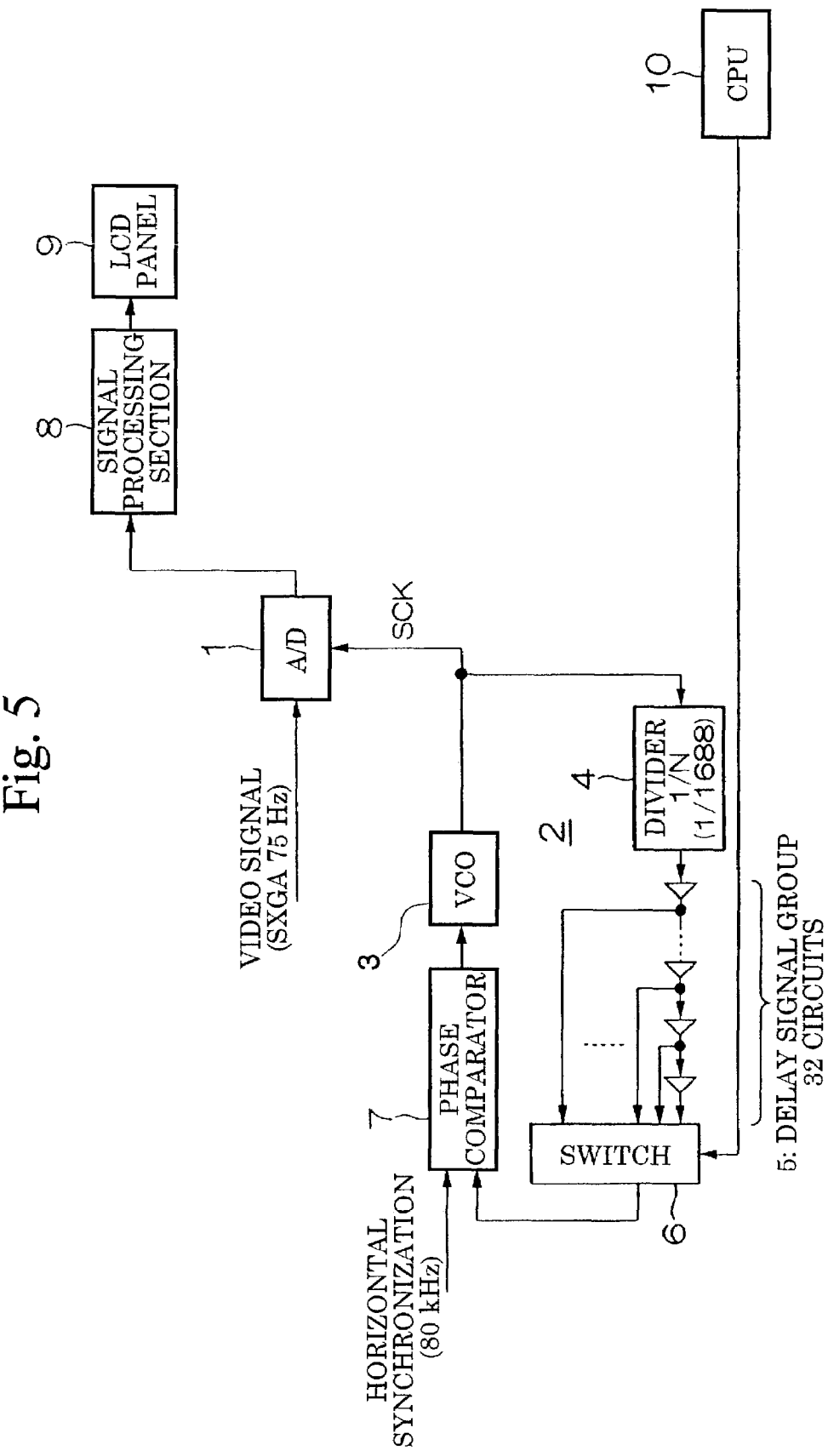
FIG. 5 is a circuit diagram showing an conventional image signal processing apparatus in which the phases of sampling clocks are adjusted.

FIG. 1 is a block diagram showing an image signal processing apparatus according to an embodiment of the present invention that is based on the above described principle. Those portions that correspond to portions in FIG. 5 are given the same descriptive symbols and a repeated description thereof is not given.

In FIG. 1, the symbol 11 indicates a frequency correction circuit that corrects the frequency characteristics before input image signals are input into the A/D converter 1, and that is formed by a high frequency compensation circuit 12 that is formed by a high pass filter (HPF) and a peaking circuit, and by a low frequency compensation circuit 13 that is formed by a low pass filter (LPF) and the like.

The high frequency compensation circuit 12 is structured to include condensers C1, C2, and C3, while the low frequency compensation circuit 13 is structured to include condensers C4, C5, and C6. A switch 14, resistors R1 and R2, and an operational amplifier 15 are connected in common to the condensers, as is shown in the drawing. By selecting one of the respective condensers using the switch 14, high frequency compensation or low frequency compensation frequency correction is performed in stages.

The symbol 16 indicates a one clock delay circuit that delays image data (output from the A/D converter 1) by the amount of one sampling clock. The symbol 17 indicates a subtracter that subtracts the difference between the image data output from the A/D converter and the image data before the one clock delayed by the 1 clock delay circuit 16. The symbol 18 indicates a one screen maximum value detection circuit that determines a maximum value in one screen (vertical period) of a difference output by the subtracter 17. The symbol 19 indicates a threshold value setting circuit that subtracts 5, for example, from the detected one screen maximum value to obtain a threshold value. The symbol 20 indicates a comparator that compares an output A of the subtracter 16 with the above threshold value Amax−5, and outputs a comparison result signal when A>Amax−5. The symbol 21 indicates a counter that counts the comparison result signals and supplies a count value to the CPU 10.

The operation of this structure will now be described.

In FIG. 1, analog image signals are sampled using sampling clocks from the PLL circuit 2 by the A/D converter 1 via the frequency correction circuit 11, and are converted into image data. In the subtracter 17, image data delayed by one clock by the 1 clock delay circuit 16 is subtracted from this image data, and the differential output A is fed to the comparator 20 and the 1 screen maximum value detection circuit 18. The 1 screen maximum value detection circuit 18 determines the maximum value in one screen of the differential output of the subtracter 17. The threshold value setting circuit 19 sets a threshold value Amax−5 by subtracting 5 from the above maximum value. The comparator 20 compares the differential output A of the subtracter 16 with the threshold value Amax−5, and outputs a comparison result signal when A>Amax−5. The counter 21 counts the comparison result signals and supplies a count value to the CPU 10.

The CPU 10 controls the sampling clock phases by switching the switch 6, and also controls frequency characteristics of input image signals by controlling the switching of the switch 14 of the frequency correction circuit 11 based on the above count value. In this case, the switch 14 is switched such that the count value is at the maximum. For example, if the input waveform is a triangular wave, as shown in FIG. 4, high frequency compensation is performed by selecting one of the condensers C1, C2, or C3 such that the count value is at the maximum. If a waveform in which overshoot is generated in a trapezoid wave is input, low frequency compensation is performed by selecting one of the condensers C4, C5, or C6 such that the count value is at the maximum.

Note that, in the present embodiment, in the threshold value setting circuit 19, a threshold value is obtained by subtracting 5 from the maximum value of the level difference value, however, it is also possible to employ a structure in which by enabling this subtracted to be varied a more appropriate threshold value can be set.

What is claimed is:

1. An image signal processing apparatus comprising:
   frequency correction means that corrects frequency characteristics of analog image signals;
   A/D conversion means that converts analog image signals that have undergone frequency correction in the frequency correction means into digital image data;
   clock generation means that supplies sampling clocks to the A/D conversion means, and also that is structured such that phases of the sampling clocks can be adjusted;
   level difference calculation means that determines a value of a difference in level between two adjacent dot waveforms in the A/D converted image data;
   maximum value detection means that determines a maximum value of the level difference value in one screen for each phase of the sampling clocks;
   comparison means that compares a threshold value obtained by subtracting a predetermined value from a maximum value of the determined level difference value with a level difference value determined by the level difference calculation means, and outputs a comparison result signal when the level difference value is higher than the threshold value;

counting means that counts the comparison result signals; and control means that controls the clock generation means, and controls phases of the sampling clocks, and also controls frequency characteristics of the frequency correction means in accordance with a count value of the counting means.

2. The image signal processing apparatus according to claim 1, wherein the control means controls frequency characteristics of the frequency correction means such that the count value of the counting means is at maximum.

3. The image signal processing apparatus according to claim 1, wherein the threshold value is variable.

4. The image signal processing apparatus according to claim 2, wherein the threshold value is variable.

5. The image signal processing apparatus according to claim 1, wherein the clock generation means is a PLL circuit is formed so as to be able to control phases of output sampling clocks in stages.

6. The image signal processing apparatus according to claim 2, wherein the clock generation means is a PLL circuit is formed so as to be able to control phases of output sampling clocks in stages.

7. The image signal processing apparatus according to claim 3, wherein the clock generation means is a PLL circuit is formed so as to be able to control phases of output sampling clocks in stages.

8. The image signal processing apparatus according to claim 4, wherein the clock generation means is a PLL circuit is formed so as to be able to control phases of output sampling clocks in stages.

9. The image signal processing apparatus according to claim 1, wherein there are provided signal processing means for processing image data obtained from the A/D conversion means, and display means for displaying processed image data.

10. The image signal processing apparatus according to claim 8, wherein there are provided signal processing means for processing image data obtained from the A/D conversion means, and display means for displaying processed image data.

11. An image signal processing method in which phases of sampling clocks are controlled when analog image signals undergo A/D conversion using sampling clocks and are converted into digital image data, wherein a value of a difference in level between two adjacent dot waveforms in the A/D converted image data is determined, a maximum value of the level difference value in one screen is determined for each phase of the sampling clocks, a threshold value obtained by subtracting a predetermined value from this maximum value is compared with the level difference value, and frequency characteristics of the analog image signals are controlled in accordance with the number of times the level difference value is higher than the threshold value.

12. The image signal processing method according to claim 11, wherein the frequency characteristics are controlled such that the number of times is at maximum.

13. The image signal processing method according to claim 11, wherein the threshold value is variable.

14. The image signal processing method according to claim 12, wherein the threshold value is variable.

15. The image signal processing method according to claim 11, wherein the phases of the sampling clocks are able to be controlled in stages.

16. The image signal processing method according to claim 12, wherein the phases of the sampling clocks are able to be controlled in stages.

17. The image signal processing method according to claim 13, wherein the phases of the sampling clocks are able to be controlled in stages.

18. The image signal processing method according to claim 11, wherein the image data is processed and displayed on display means.

19. The image signal processing method according to claim 17, wherein the image data is processed and displayed on display means.

20. The image signal processing apparatus according to claim 1, wherein the level difference value is a luminance difference value.

21. The image signal processing method according to claim 11, wherein the level difference value is a luminance difference value.

* * * * *